Jan. 9, 1968  W. O. MONGESKU ET AL  3,362,732
ARRANGEMENT FOR MOUNTING A CONTROL DEVICE
Filed Aug. 24, 1965
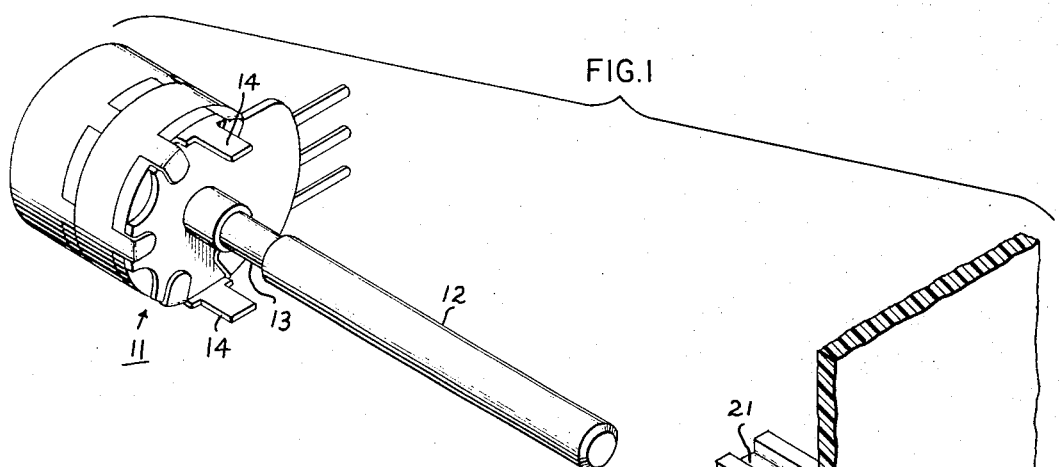
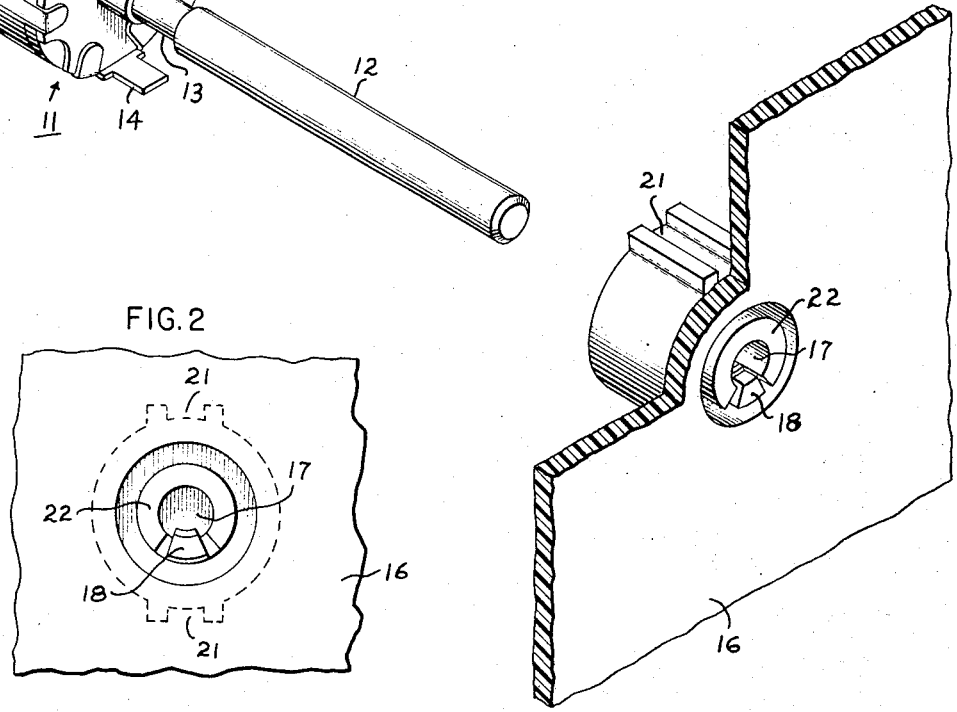
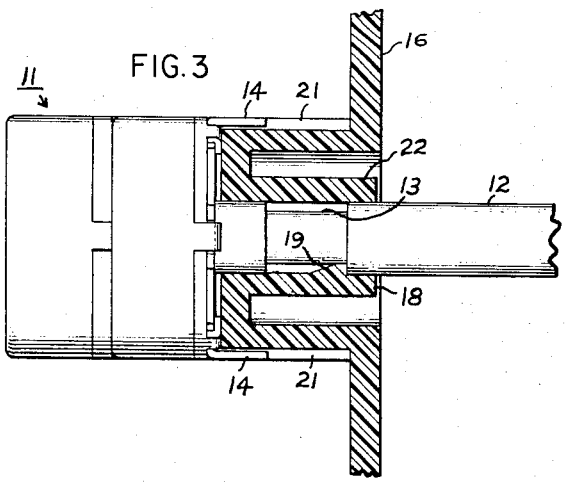
INVENTORS:
WILLIAM B. SCOTT, JR.
WILLIAM O. MONGESKU,
BY *Norman C. Fulmer*
THEIR ATTORNEY.

United States Patent Office 3,362,732
Patented Jan. 9, 1968

3,362,732
ARRANGEMENT FOR MOUNTING A
CONTROL DEVICE
William O. Mongesku, Utica, and William B. Scott, Jr.,
New Hartford, N.Y., assignors to General Electric Company, a corporation of New York
Filed Aug. 24, 1965, Ser. No. 482,069
3 Claims. (Cl. 287—20)

ABSTRACT OF THE DISCLOSURE

An arrangement for mounting a control device including a control shaft to a housing having an opening extending therethrough, the housing being provided with a deflectable rib extending into the opening to lockedly engage an annular groove provided on the control device shaft to retain the shaft in the opening.

---

This invention relates to arrangements for mounting control devices onto a housing, and will be particularly described as applied to mounting a variable resistance potentiometer onto a panel.

Various ways have been devised for mounting control devices onto housings. For example, the control device usually is inserted through an opening of the housing and held in place by means of a nut, or screws, bent tabs, or solder.

An object of the invention is to provide an improved arrangement for mounting a control device.

Another object is to provide a simple, low-cost, and reliable arrangement for mounting a control device.

Additional objects will be apparent from the following description and claims, and from the accompanying drawing.

The control device mounting of the invention comprises, briefly and in a preferred embodiment, a housing provided with an opening through which a rotatable control shaft of the control device is positioned, the shaft being provided with an annular groove in said opening, the housing being provided with a deflectable rib extending into the opening in the path of and deflectable by the shaft during its insertion into said opening. When the shaft is in desired position, the rib extends into the annular groove of the shaft to lock the control device in longitudinal position. The control device bears against the back of the housing to aid in longitudinal positioning, and is provided with one or more frontwardly extending prongs which extend into recesses of the housing to lock the control device against rotation.

In the drawing, FIG. 1 is a perspective view of a disassembled control device and housing in accordance with a preferred embodiment of the invention; FIG. 2 is a front view of FIG. 1; and FIG. 3 is a side sectional view of the arrangement in assembled condition.

A control device such as a variable-resistance potentiometer is provided with a rotatable shaft 12 extending therefrom. This shaft is provided with an annular groove 13. The control device is provided with a pair of frontwardly extending prongs 14.

A housing 16, which may comprise a cabinet, chassis, circuit board, or bracket or the like, is preferably made from slightly resilient plastic and is provided with an opening 17 of a size to accommodate the shaft 12 and to act as a bushing for this shaft. A deflectable rib 18, which preferably is formed integrally with the housing, normally extends into the opening 17 from a side thereof and preferably has a tapered surface 19, as shown. When the control device 11 is positioned so that its shaft 12 extends into the opening 17 from the rear of the housing 16, the shaft 12 deflects the rib 18 temporarily until the control device and its shaft are in desired longitudinal position, whereupon the rib 18 snaps into the annular groove 13 to hold the shaft 12 in longitudinal position, as shown in FIG. 3. At the same time, the control device 11 bears against the rear of the housing 16, whereby the device is restrained from longitudinal movement in both axial directions.

Recesses 21 are provided in the housing 16 to accommodate the prongs 14 and restrain the control device 11 from rotation with respect to the housing 16, whereby only the shaft 12 is rotatable with respect to the housing 16 and device 11.

Preferably, the opening 17 is contained in a frontwardly extending reentrant hub 22 in the housing 16, as shown. The deflectable rib 18 is defined by a pair of parallel slots in the wall of the hub 22. Preferably this rib and the associated pair of parallel slots extends over an arc of about 60 degrees of the opening 17, leaving approximately 300 degrees of arc in the forward part of the opening to act as a suitable bushing for the shaft 12. The recesses 21 are provided on the rearwardly extending portion of the reentrant hub 22.

The control device 11 can be removed from the housing 16, for servicing for example, by deflecting the rib 18 with a screw driver or other suitable tool.

The invention achieves its objectives and provides a simple, economical, and easily assembled arrangement for mounting a control device.

While a preferred embodiment of the invention has been shown and described, other embodiments and modifications thereof will be apparent to those skilled in the art and will fall within the scope of invention as defined in the following claims.

What we claim is:

1. An arrangement for mounting a control device provided with a frontwardly extending prong and a rotatable shaft extending therefrom, comprising a housing provided with an opening therethrough for accommodating and functioning as a bushing for said shaft, said housing being provided with a deflectable rib extending into said opening, said housing further being provided with a recess for receiving said frontwardly extending prong to prevent rotation of said control device with respect to said housing, and said shaft being provided with an annular groove into which said rib extends to provide longitudinal positioning of said shaft and control device with respect to said housing.

2. An arrangement for mounting a control device provided with a rotatable shaft extending therefrom, comprising a housing provided with a reentrant hub having an opening therein for accommodating and functioning as a bushing for said shaft, said hub being provided with a pair of slots defining a deflectable rib extending into said opening, and said shaft being provided with an annular groove into which said rib extends to provide longitudinal positioning of said shaft and control device with respect to said housing.

3. An arrangement for mounting a control device provided with a rotatable shaft extending therefrom, comprising a housing provided with an opening therethrough for accommodating and functioning as a bushing for said shaft, said housing being provided with deflectable rib extending into said opening, the surface of said rib in said opening being tapered to facilitate deflection thereof by said shaft, and said shaft being provided with an annular groove into which said rib extends to provide longitudinal positioning of said shaft and control device with respect to said housing.

References Cited

UNITED STATES PATENTS 2,145,160   1/1939   Douglas _____ 284—27 X
2,616,643   11/1952  Budd _____ 287—20 X CARL W. TOMLIN, Primary Exminer.

ROBERT SKUDY, Assistant Examiner.